March 25, 1924.
W. S. HALSEY
SCREW JACK
Filed June 23, 1922
1,487,940
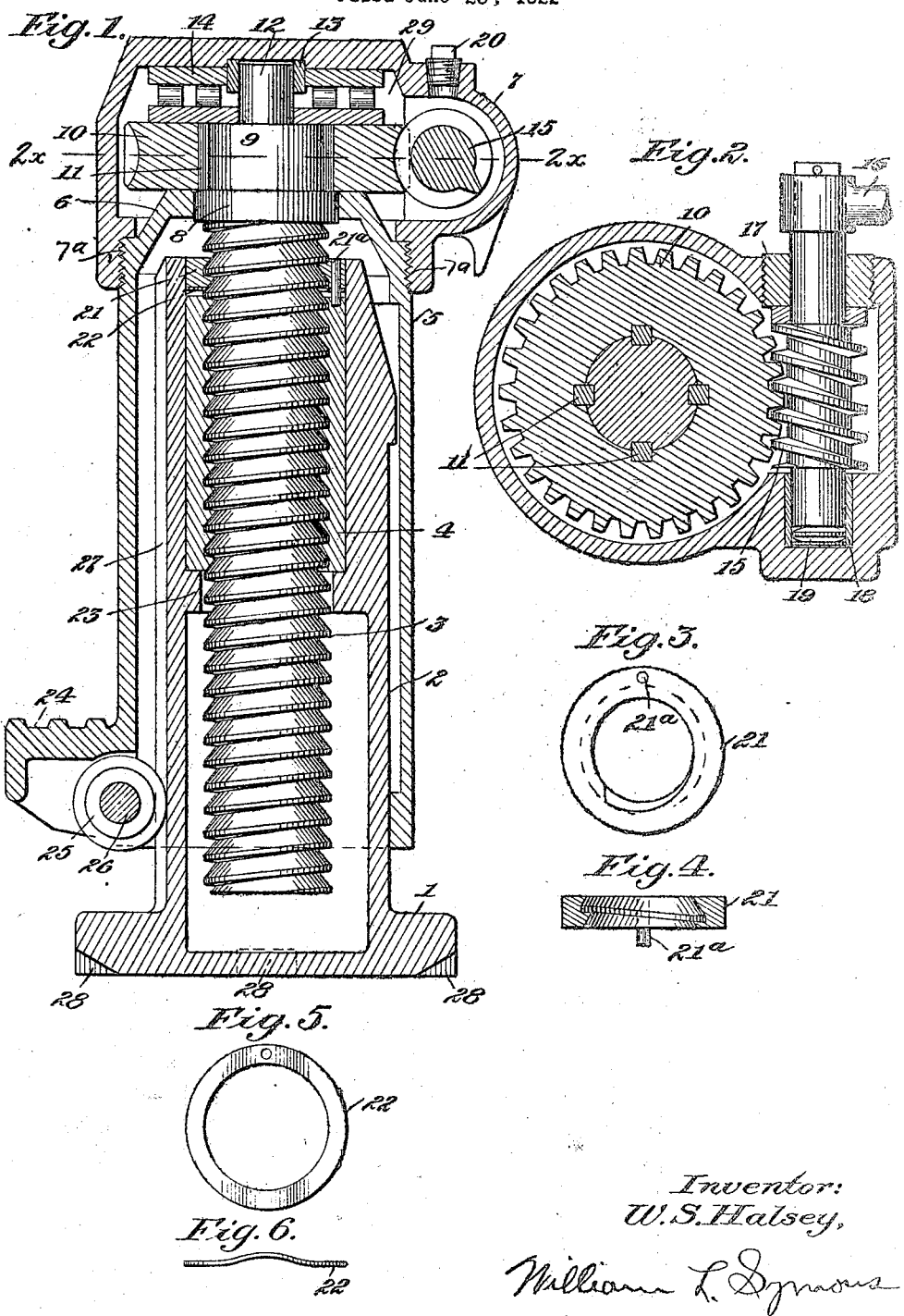
Inventor:
W. S. Halsey,
William L. Symons
Atty.

Patented Mar. 25, 1924.

1,487,940

UNITED STATES PATENT OFFICE.

WILLIAM S. HALSEY, OF DOVER, NEW JERSEY.

SCREW JACK.

Application filed June 23, 1922. Serial No. 570,455.

*To all whom it may concern:*

Be it known that I, WILLIAM S. HALSEY, a citizen of the United States of America, residing at Dover, in the county of Morris and State of New Jersey, have invented certain new and useful Improvements in Screw Jacks, of which the following is a specification.

My invention relates to improvements in screw jacks.

The general objects of my invention are to construct a screw jack which is simple in operation, which may be rapidly raised and lowered, which has a high degree of efficiency and which may be manufactured inexpensively.

A further object of my invention is the construction of a screw jack having a lifting foot, the foot being used to raise bodies which lie too near the base on which the jack must operate to allow the head to be placed under the body, the movement of the foot being guided by a roller running in a groove in the standard.

A further object of my invention is to reduce the friction in operating the jack.

A still further object of my invention is the construction of a jack having an oil cavity filled with oil in which parts of the jack operate while submerged in oil.

With these and further objects in view, one embodiment of my invention is shown in the accompanying drawings in which, Figure 1 is a central, vertical section of my device;

Figure 2 is a section on line $2^x$—$2^x$;

Figure 3 is a plan view of an auxiliary nut;

Figure 4 is a section thereof;

Figure 5 is a plan view of a resilient washer and

Figure 6 is a section thereof.

My improved jack comprises a base 1 having an integral standard 2; screw 3 which operates through a nut 4; a sleeve 5 having at the top thereof a journal bearing or collar 6; gear casing 7 which is screw threaded at $7^a$ to the sleeve; a journal or screw head 8 and journal extension 9; worm wheel 10 keyed to the journal extension by keys 11; reduced screw end 12 having a bearing 13; roller bearings and casing therefor 14 inserted between the top of the worm wheel and the underside of the gear casing 7; a driving screw 15 suitably journalled in the casing, said driving screw meshing with the worm wheel; a handle 16 to operate the driving screw; screw threaded journal bearing 17 for the driving screw; a suitable journal bearing 18 for the driving screw and thrust buttons 19 for the driving screw. The compartment formed by the top of the sleeve and the casing has an opening therein closed by a screw threaded oil plug 20. Placed at the top of the column and above the top of the nut is an auxiliary nut 21 having therein a pin $21^a$ to hold this auxiliary nut in place, the pin passing into an opening in the top of the nut. Placed between the nut and the auxiliary nut is a resilient washer 22. The nut is held in position in the column by an annular shoulder 23. The sleeve has a foot or auxiliary lifting head 24. A roller 25 is journalled on the sleeve at 26, and so placed that it runs in a groove 27 in the column. At each quarter of the base there is an opening 28 adapted to be used in adjusting or "pinching" the jack into position.

The construction described forms an oil compartment or reservoir 29 in order that the worm, driving screw and other parts may operate submerged in oil.

The auxiliary nut and washer enable the screw and nut to be properly lubricated and reduce friction. The shape of the washer 22 forms an oil pocket between the nut and the auxiliary nut. When the jack is operated this washer will be flattened forcing the oil down to lubricate the nut, but will resume its normal shape when the load has been removed, and permit the oil again to collect.

It will be noted that the journal on the screw has a bearing which is an integral part of the sleeve and that the casing in which the driving screw is journalled is screw-threaded to this sleeve. This arrangement of the parts prevents the spreading of the driving screw and the vertical screw, the spreading of these essential parts being a well-known defect in jacks of this type. It is further noted that the journal on the screw has several advantages, among which are the large bearing surface presented for the lower edge of the worm wheel and the large bearing surface which comes in contact with the nut, thus preventing jamming.

The roller has the advantage of preventing binding of the sleeve against the standard when the foot is used to raise objects, the roller acting freely in the groove.

The openings in the base enable the jack to be adjusted in the necessary position.

The operation of my jack when power is applied by means of the handle 16, or by any other suitable means, will be readily understood from the foregoing description.

Having described my invention what I claim and desire to protect by Letters Patent is:

1. In a screw jack, a standard, a vertical screw to operate in said standard, a head on said screw of greater diameter than said screw and constituting a journal and a sleeve around said standard, the upper end of said sleeve constituting a journal bearing for said journal.

2. In a screw jack having a vertical screw and a driving screw, means to prevent the spreading of the vertical screw and the driving screw, comprising a head on the vertical screw of greater diameter than the screw and a sleeve for said screw, said sleeve having a collar to surround said head and in which said head revolves, said collar being an integral part of said sleeve.

3. A screw jack comprising a vertical screw, a sleeve for said screw, said sleeve having an integral collar at one end thereof, a head on said screw of greater diameter than said screw and adapted to revolve in said collar, and a casing removably attached to said sleeve and forming an oil compartment.

4. A screw jack comprising a base, a standard, a nut in said standard, a screw in said nut, a sleeve, a casing, said casing being removably attached to said sleeve, a worm on said screw, a driving screw to operate said worm, said sleeve having a foot thereon, and a roller journalled to said sleeve, said standard having a vertical slot therein, and said roller being adapted to travel in the groove in said standard.

5. A screw jack comprising a base, a standard, a nut, an auxiliary nut placed above said nut, a resilient washer inserted between said nuts, and a screw adapted to operate through said nuts and washer.

6. A jack comprising a standard having an opening therein, a nut in said opening, an auxiliary nut in said opening, a resilient member between said nuts adapted to form an oil pocket and to reduce friction, a sleeve around said standard and having a collar at one end thereof, a head on said screw adapted to turn in said collar, a screw head extension, a worm wheel attached to said screw head extension, a casing attached to said sleeve, a driving screw journaled in said casing and meshing with said worm, and means to apply power to said driving screw to operate said jack.

7. A jack comprising a standard having an opening therein, a nut in said opening, an auxiliary nut placed above said nut, a resilient member between said nuts adapted to form an oil pocket and to reduce friction, a sleeve around said standard and having a collar at one end thereof, a head on said screw adapted to turn in said collar, a screw head extension, a worm wheel attached to said screw head extension, a casing attached to said sleeve, friction bearings between the top of said worm wheel and the underside of said casing, a driving screw journaled in said casing and meshing with said worm, and means to apply power to said driving screw to operate said jack.

In testimony whereof I affix my signature.

WILLIAM S. HALSEY.